United States Patent
Yoshikawa et al.

[11] Patent Number: 6,025,903
[45] Date of Patent: Feb. 15, 2000

[54] PIECE NEGATIVE FEEDING APPARATUS

[75] Inventors: Tohru Yoshikawa; Hiroshi Miyawaki, both of Wakayama, Japan

[73] Assignee: Noritsu Koki Co., Ltd., Wakayama-ken, Japan

[21] Appl. No.: 08/990,002

[22] Filed: Dec. 12, 1997

[30] Foreign Application Priority Data

Dec. 13, 1996 [JP] Japan ................................. 8-333226

[51] Int. Cl.$^7$ ................................................. G03B 27/52
[52] U.S. Cl. ................................. 355/40; 355/75; 396/315
[58] Field of Search .............................. 355/27, 40, 41; 396/310, 311

[56] References Cited

U.S. PATENT DOCUMENTS

| | | | |
|---|---|---|---|
| 3,733,018 | 5/1973 | Breimayer | 226/2 |
| 4,286,869 | 9/1981 | Kogane et al. | 355/75 |
| 4,574,692 | 3/1986 | Wahli | 101/2 |
| 4,637,712 | 1/1987 | Arnold et al. | 355/75 |
| 5,179,409 | 1/1993 | Kazami et al. | 355/75 |
| 5,587,752 | 12/1996 | Petruchik | 396/315 |
| 5,767,686 | 6/1998 | Kespohl | 324/662 |
| 5,864,733 | 1/1999 | Mae et al. | 399/46 |

FOREIGN PATENT DOCUMENTS

| | | |
|---|---|---|
| 35 27 584 A1 | of 1987 | Germany . |
| 5782332 | 11/1955 | Japan . |
| 52-135721 | 11/1977 | Japan .............................. G03B 27/00 |
| 56-42227 | 4/1981 | Japan .............................. G03B 27/52 |
| 59-34261 | 8/1984 | Japan .............................. G03B 27/46 |

OTHER PUBLICATIONS

Patent Abstract of Japan Patent Application No. 59–028163 Jan. 5, 1985.
Patent Abstract of Japan Patent Application No. 51–073683 Dec. 27, 1977.
Patent Abstract of Japan Patent Application No. 51–027938 Sep. 16, 1977.
Patent Abstract of Japan Patent Application No. 60–138469 Dec. 26, 1986.
Patent Abstract of Japan Patent Application No. 06–264143 May 17, 1996.

*Primary Examiner*—Georgia Epps
*Assistant Examiner*—Timothy Thompson
*Attorney, Agent, or Firm*—Fulbright & Jaworski, LLP

[57] ABSTRACT

A piece negative feeding apparatus for successively feeding piece negatives to an exposing section. The apparatus includes a piece negative storage 10 for storing piece negatives 2 in a plurality of orders, as divided into the orders each consisting of at least one piece negative, a negative transport mechanism 20 for transporting the piece negatives from the piece negative storage 10 to the exposing section 8, and an order demarcation recognizing device 7a for recognizing demarcations between the orders based on order identifiers 3 storable in the piece negative storage 10 and transportable by the negative transport mechanism 20.

5 Claims, 5 Drawing Sheets

6,025,903

PIECE NEGATIVE FEEDING APPARATUS

BACKGROUND OF THE INVENTION

1. Field of the Invention

This invention relates to a piece negative feeding apparatus for successively feeding one piece negative after another to an exposing section.

2. Description of the Related Art

Generally, a negative film used in taking pictures with a camera is brought to a photo processing agent for simultaneous printing. At a developing laboratory, the negative film is developed and image frames rendered visible are printed on printing paper. The prints and the developed negative film are handed over from the photo processing agent to the customer. Prior to this, the negative film is cut into piece negatives each having four or six frames, and the piece negatives are put into a negative sheet. When additional prints are needed at a later date, the customer fills in a predetermined order form with image frames to be printed and the numbers of prints required, and brings the negative sheet containing the piece negatives along with the filled form to the photo processing agent (the unit of such additional prints being called an order also). The developing laboratory receives such order forms and negative sheets from varied photo processing agents. To make additional prints, i.e. to perform reorder processes efficiently, at the developing laboratory, as disclosed in Japanese Utility Model Laying-Open Publication S57-82332, an elongate film is formed by joining together numerous piece negatives to be additionally printed, with splicing tape, and with a leader tape inserted for each order which records positions of the frames to be additionally printed and numbers of additional prints to be made. The elongate film is fed continuously for exposure. After the exposure, the splicing tape must be separated from the elongate film, and the latter divided into the piece negatives again. It is a time-consuming operation to apply and separate the splicing tape. The continuous feeding of the elongate film provides a sufficient scale merit only when piece negatives in about 100 orders are joined together. Thus, delays tend to occur with additional printing processes.

On the other hand, an apparatus is known from Japanese Patent Publication S59-34291, which performs an exposing process by placing each negative sheet, i.e. each order, on a table and taking piece negatives to be additionally printed out of the negative sheet. This processing mode imposes a considerable burden on the operator since, for an exposing process of each order, the negative sheet must be removed from the table, and a new negative sheet must be placed thereon.

Further, Japanese Patent Laying-Open Publication S5642227 discloses an apparatus for successively inserting numerous piece negatives between an elongate tape wound up on a reel, and feeding the numerous pieces one after another in a reverse order by rewinding the elongate tape. Reorder information such as demarcations between the piece negatives in different orders is sequentially recorded on a separate magnetic tape. It is therefore necessary, in time of an exposing process, to run the magnetic tape to confirm the reorder information on the respective piece negatives. This apparatus has an inherent drawback that, in the event of the piece negatives going out of order due to a transport error or the like, the reorder information becomes inaccurate for succeeding processes.

SUMMARY OF THE INVENTION

This invention has been made having regard to the disadvantages of the prior art noted above, and its object is to provide a piece negative feeding apparatus for feeding negative pieces in numerous orders one after another to an exposing section while reliably linking order information such as order demarcations to the respective piece negatives.

The above object is fulfilled, according to this invention, by a piece negative feeding apparatus for successively feeding piece negatives to an exposing section, comprising a piece negative storage for storing piece negatives in a plurality of orders, as divided into the orders each consisting of at least one piece negative, a negative transport mechanism for transporting the piece negatives from the piece negative storage to the exposing section, and an order demarcation recognizing device for recognizing demarcations between the orders based on order identifiers storable in the piece negative storage and transportable by the negative transport mechanism.

With this construction, the order identifiers also are fed out as mixed with the piece negatives successively fed from the piece negative storage to the exposing section by the negative transport mechanism. As a result, the order demarcation recognizing device recognizes the demarcations between the orders. The piece negatives and the order identifiers acting as media for recording order information are stored in the same piece negative storage, and transported by the same transport mechanism. That is, the flows of objects and information are integrated to realize an improved accuracy of information transmission. Even if the continuity of the piece negatives is lost due to transport errors or the like, a normal condition may be restored with ease by the presence of a next order identifier.

In a preferred embodiment of this invention, the piece negative storage is constructed to store the piece negatives sequentially, each of the order identifiers being arranged between two adjacent piece negatives belonging to different orders. With this feature, not only the integration of the flows of objects and information is promoted, but each order identifier acts physically as a marker between piece negatives belonging to different orders to facilitate visual checking by the operator.

Preferably, each order identifier has data of varied order information such as an acceptance number, positions of frames to be additionally printed, or numbers of additional prints required. In this case, it is proposed to record such data directly on the order identifier in a mark sheet mode (including a punched card mode), bar code mode or magnetic recording mode, or to apply a seal recording such data to the order identifier. The former is suited to the mark sheet mode and magnetic recording mode. The latter is suited to the bar code mode.

In a preferred embodiment of this invention, the order identifiers comprise order pieces corresponding in width and thickness to the negative pieces. In this case, the order pieces may be stored in the piece negative storage as are the piece negatives, and may be transported by the negative transport mechanism with facility. Moreover, the order pieces may be inserted into the negative sheets together with corresponding piece negatives. The integration of objects (which are the piece negatives here) and order information is maintained substantially through the loop of an additional printing order between the customer, photo processing agent and developing laboratory. There is a reduced chance of errors being made in placing an order, accepting the order and forwarding the order, thereby contributing to promotion of efficient operations.

The apparatus may further comprise a transport state evaluating device for evaluating a state of transport (e.g.

blocking or jamming) of the piece negatives by detecting perforations formed in the piece negatives. In this case, the order pieces may also have dummy perforations formed therein, and the transport state evaluating device may evaluate a state of transport of the order pieces by detecting the dummy perforations formed therein. Then, an existing device for checking the transport state of the piece negatives may be used to check the transport of the order pieces. The dummy perforations may be obtained by forming, in the order pieces, bores similar to the film perforations, or forming light penetrable regions on the order pieces.

Other features and advantages of this invention will be apparent from the following description of the embodiment to be taken with reference to the drawings.

DESCRIPTION OF THE PREFERRED EMBODIMENT

Figure 1:
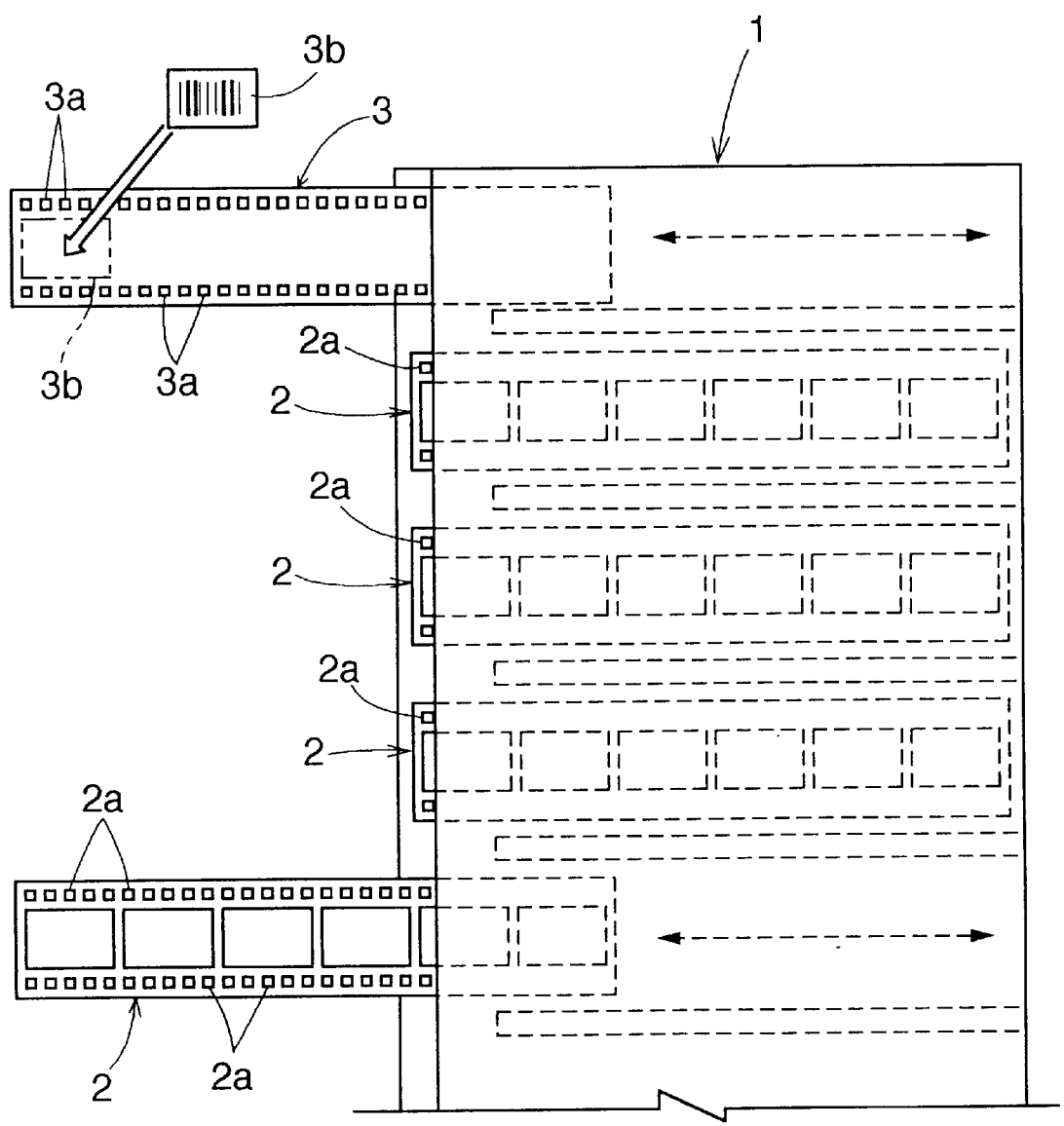
FIG. 1 is a plan view of a negative sheet containing an order piece acting as an order identifier as well as piece negatives.

When placing an order for additional photo prints (reorder), a customer gives a photo processing agent a negative sheet 1 containing piece negatives 2 as shown in FIG. 1. At this time, the photo processing agent inserts, into the negative sheet 1, an order piece 3 having an order seal 3*b* applied thereto. The order seal 3*b* includes a bar code recording additional printing data such as the positions of frames to be additionally printed, the numbers of additional prints, the shop code, acceptance No. and so on. The order piece 3 includes an opaque layer formed on a transparent film material having the same shape as the piece negatives 2, with transparent areas remaining only in positions corresponding to perforations 2*a* in the piece negatives 2. These transparent areas define dummy perforations 3*a*. Thus, a transporting state of the order piece 3 may be monitored by detecting the dummy perforations 3*a* with an optical sensor. The order piece 3 only has to have a similar shape and elasticity to the piece negatives 2. It is of course possible to use a cut piece of exposed or unexposed negative film as the order piece 3. In that case, the dummy perforations 3*a* are identical to the perforations 2*a* in the piece negatives 2.

Figure 2:
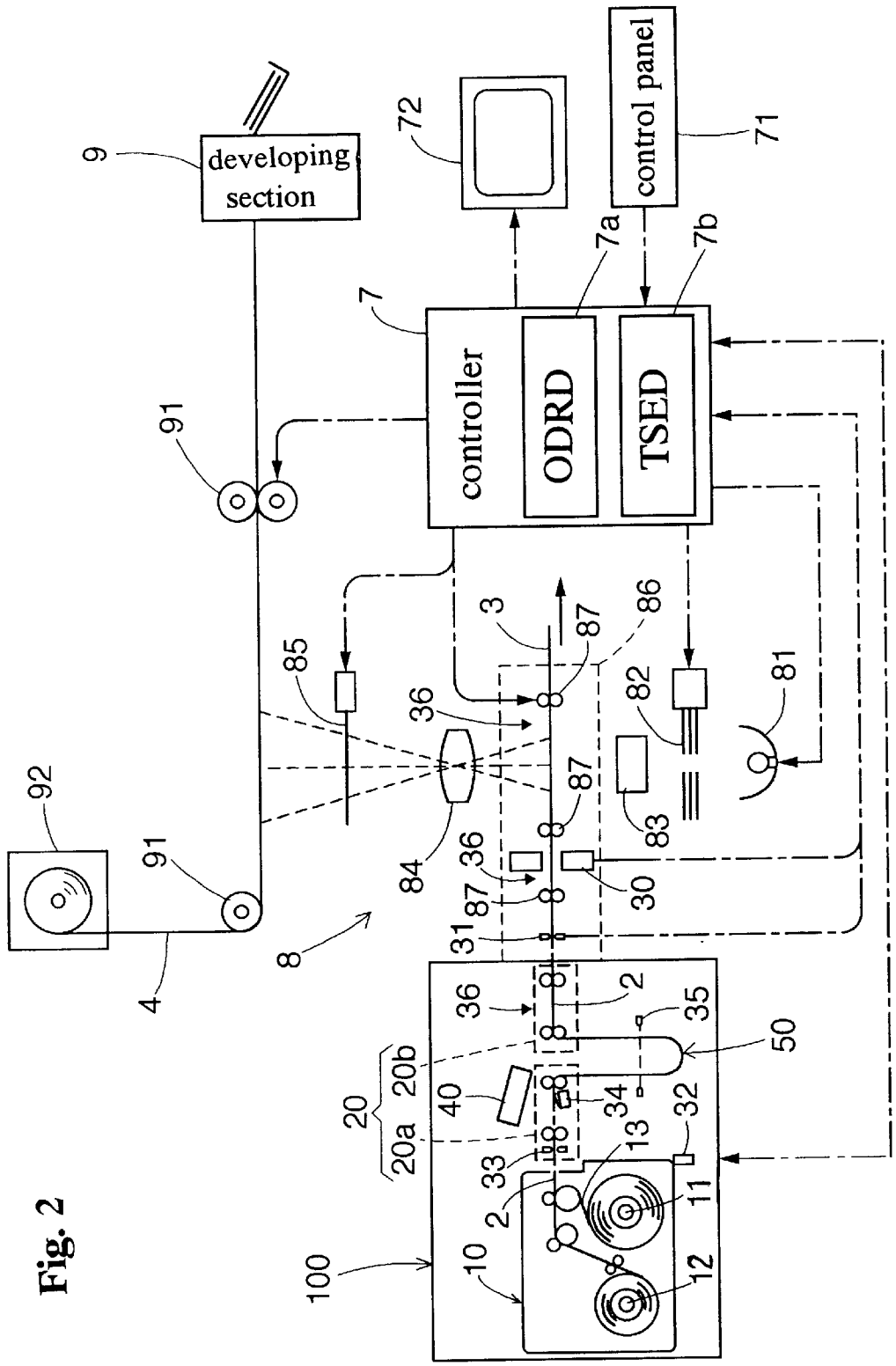
FIG. 2 is a block diagram of a printer/processor employing a piece negative feeding apparatus according to this invention.

FIG. 2 shows a block diagram of a printer/processor employing a piece negative feeding apparatus 100 according to this invention. The printer/processor uses, in time of simultaneous printing, an elongate film formed by joining numerous negative films with splicing tape and wound on a reel, and in time of reorder processing, piece negatives 2 cut from negative films and each having four or six image frames. The block diagram of FIG. 2 shows a processing of piece negatives 2. The main components illustrated include the piece negative feeding apparatus 100 for successively feeding out numerous piece negatives 2 stored therein, an exposing section 8 for projecting and exposing images of the piece negatives 2 on printing paper 4, a developing section 9 for developing the printing paper 4 having been exposed, and a controller 7 for controlling operations of these components.

The controller 7 has, connected thereto, a control panel 71 for inputting various control commands, and a monitor 72 for displaying the images of the piece negatives 2 read by a scanner 30. When a piece negative 2 to be printed is fed from the piece negative feeding apparatus 100 to the exposing section 8, the scanner 30 reads the image of each frame of piece negative 2 to be printed. The resulting image information is transmitted to the controller 7. The controller 7 determines exposing conditions from the image information thus obtained. Then, the controller 7 simulates an image expected to result from a projection and exposure on the printing paper 4 with the exposing conditions determined, and causes the monitor 72 to display the simulated image.

The exposing section 8 includes an exposing light source 81, a light adjustment filter 82 for adjusting a color balance of irradiating light emitted from the exposing light source 81, with yellow, magenta and cyan filters movable into and out of an exposing optical path, a mirror tunnel 83 for uniformly mixing the colors of the light after the color balance adjustment through the light adjustment filter 82, a printing lens 84 for forming images of film frames to be printed on the printing paper 4, a shutter 85, and an auto negative mask 86 defining a transport line for transporting piece negatives to an exposure point. The negative mask 86 includes, besides the scanner 30 described hereinbefore, negative transporting drive rollers 87 and a negative detecting sensor 31.

The printing paper 4 is drawn from a paper magazine 92 and, after being exposed, fed to the developing section 9 by paper transporting drive rollers 91.

For an exposing process, positions of the filters of the light adjustment filter 82, and an opening time of the shutter 85, i.e. an exposure time, are controlled according to the exposing conditions determined by the controller 7. The operator of the printer/processor may observe images displayed on the monitor 72, and input instructions to correct the exposing conditions through the control panel 71 unless proper images are obtained. Then, the controller 7 corrects the exposing conditions based on the correcting instructions and determines final exposing conditions. Based on the exposing conditions determined in this way, the controller 7 controls operations of the respective components of the exposing section 8 to project and expose the images of piece negatives 2 on the printing paper 4 drawn from the paper magazine 92.

Figure 3:
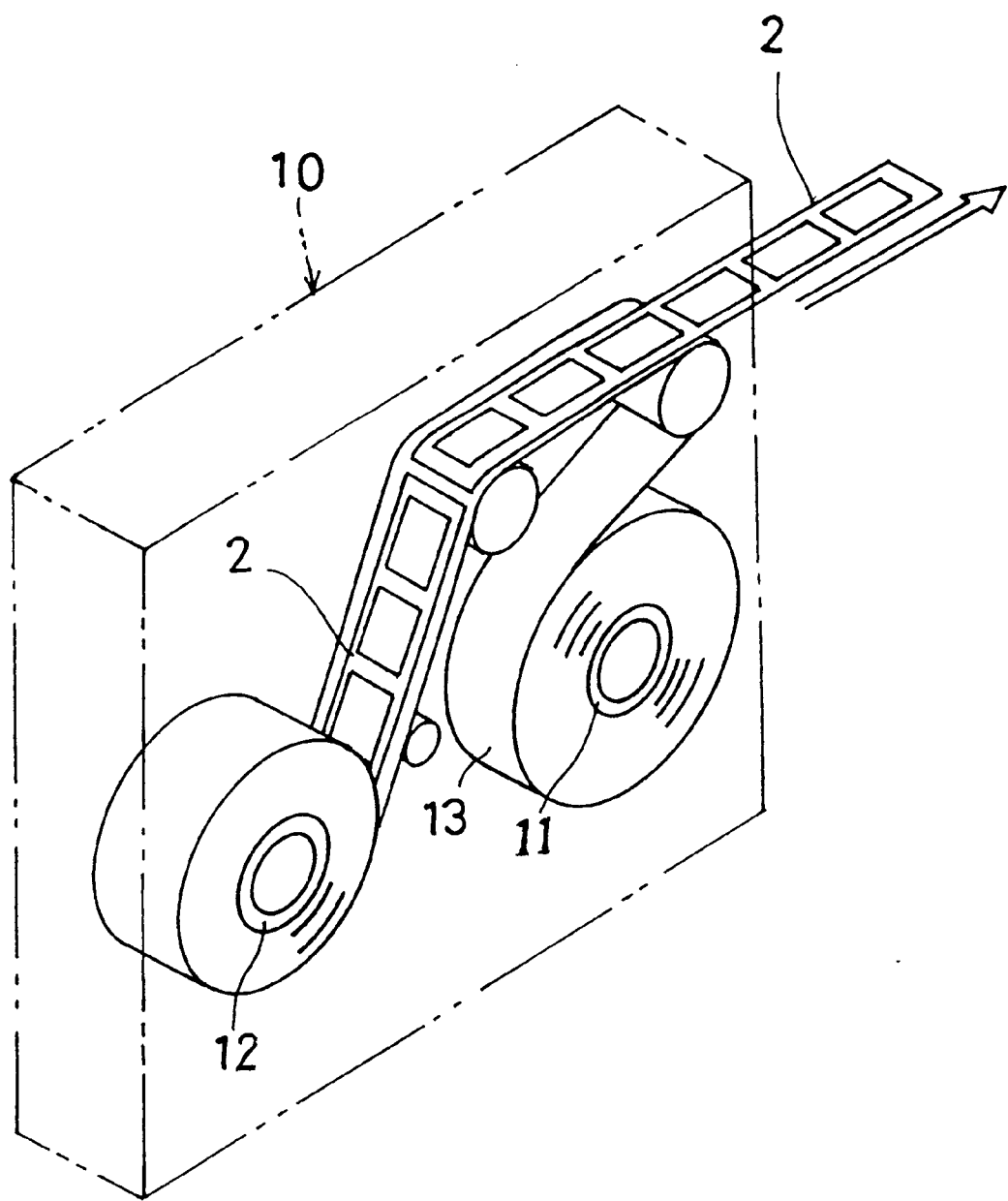
FIG. 3 is a schematic view of a piece negative storage.

The piece negative feeding apparatus 100 includes a piece negative storage 10 of the detachable magazine type, and a negative transport mechanism 20 for transporting the piece negatives 2 drawn out of the piece negative storage 10 to the auto negative mask 86. As shown in FIG. 3, the piece negative storage 10 stores numerous piece negatives 2 and order pieces 3 sequentially. The piece negatives 2 and order pieces 3 are inserted between wraps of elongate tape 13 extending between and wound on a first winding core 11 and a second winding core 12. The piece negative storage 10 is a known storage as disclosed in Japanese Patent Laying-Open Publication S56-42227, for example. It is of course possible to employ various other storage forms as piece negative storage 10, such as the tray conveyer type for successively holding the piece negatives 2 and order pieces 3 on trays, and the drum cassette type for successively inserting the piece negatives 2 and order pieces 3 in numerous slits formed in a peripheral surface of a drum.

The negative transport mechanism 20 is divided into a first transport section 20*a* disposed adjacent the piece negative storage 10, and a second transport section 20*b* disposed adjacent the auto negative mask 86. A loop section 50 is formed between the two transport sections 20a and 20b for temporarily storing the piece negatives 2 and order pieces 3 sagging from the transport line.

The piece negative feeding apparatus 100 includes various sensors arranged in appropriate positions therein and connected to the controller 7 for controlling operations. These sensors include, for example, a storage detecting sensor 32 for detecting the piece negative storage 10 mounted in place, a first negative detecting sensor 33 for detecting the piece negatives 2 and order pieces 3 adjacent an outlet of the piece negative storage 10, a second negative detecting sensor 34 for detecting the piece negatives 2 and order pieces 3 immediately upstream of the loop section 50, and a loop sensor 35 for detecting the piece negatives 2 and order pieces 3 stored in the loop section 50.

The controller 7 includes an order demarcation recognizing device 7a provided in substance by a program. A demarcation between orders is recognized by processing a signal inputted to the controller 7 from the first negative detecting sensor 33, and is used in subsequent processes such as sorting of finished prints. The recognition of demarcations between orders by the order demarcation recognizing device 7a is achieved in a simple way by a known method based on patterns of the detection signals from the first negative detecting sensor 33 with respect to the piece negatives 2 and order pieces 3, or signals from particular detecting positions of the order pieces 3.

The controller 7 further includes a transporting state evaluating device 7b similarly provided in substance by a program. This device 7b checks a state of transport of the piece negatives 2 and order pieces 3, e.g. whether the transport is blocked or not, based on signals from a negative transport check sensor 36 which detects the perforations in the piece negatives 2 and order pieces 3.

Figure 4:
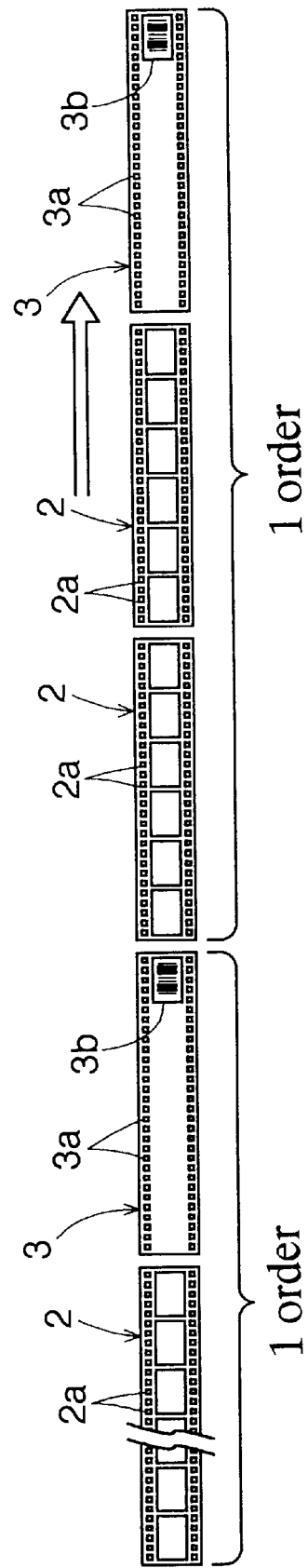
FIG. 4 is an explanatory view of a transport arrangement of order pieces and piece negatives.

As shown in FIG. 4, the piece negatives 2 and order pieces 3 fed from the piece negative feeding apparatus 100 to the exposing section 8 are arranged such that each order is led by an order piece 3 followed by piece negatives 2 to be additionally printed. That is, the order piece 3 marks a boundary between orders for additional prints. Data necessary for additional printing are recorded in a bar code on the order seal 3b applied to the order piece 3. By reading this bar code, the controller 7 acquires information as to which frames of the piece negatives 2 following the order piece 3 should be printed and how many prints are required. The controller 7 controls operations of the respective components of the exposing section 8 based on this information.

Figure 5:
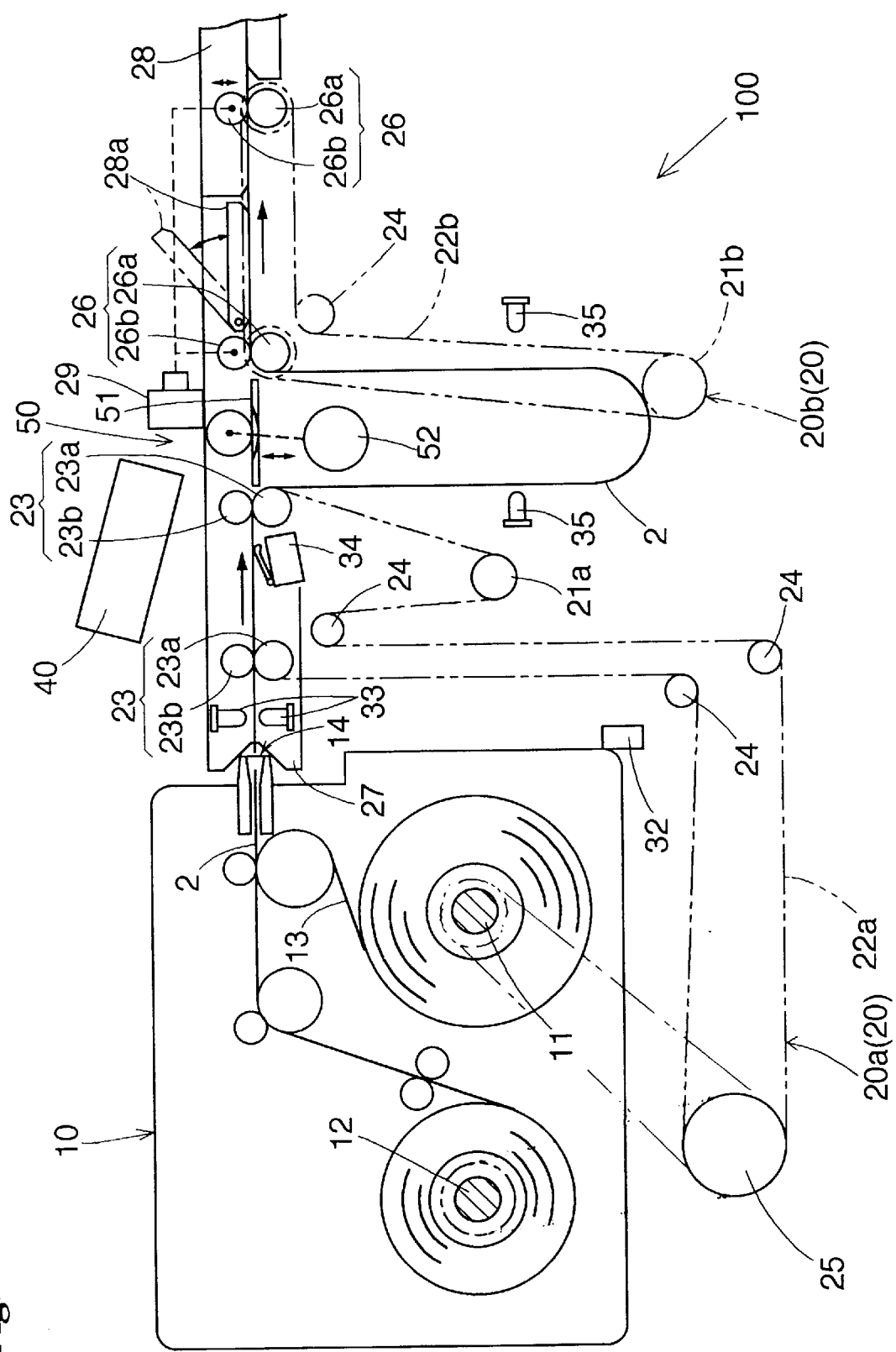
FIG. 5 a schematic view of the piece negative feeding apparatus.

FIG. 5 shows a schematic view of the piece negative feeding apparatus 100. The first transport section 20a includes a drive roller set 23 having a drive roller 23a for receiving power from a first drive motor 21a through a belt 22a, and a press roller 23b opposed to the drive roller 23a. This belt transmission line extends through deflecting pulleys 24 to a power take-out pulley 25 disposed below the piece negative storage 10. The power take-out pulley 25 is operatively connected, by a coupling device not shown, to the first winding core 11 when the piece negative storage 10 is mounted in place. The first winding core 11 is rotatable by the drive motor 21a whereby the elongate tape 13 is unwound from the second winding core 12 and taken up on the first winding core 11. As a result, the piece negatives 2 and order pieces 3 are fed through a feeding port 14 to the first 10 transport section 20a.

The second transport section 20b includes a drive roller set 26 having a drive roller 26a for receiving power from a second drive motor 21b through a belt 22b, and a press roller 26b opposed to the drive roller 26a. Numeral 29 denotes a pressure release solenoid for raising the press roller 26b out of pressure contact with the drive roller 26a. By raising the press roller 26b out of pressure contact, the transport of piece negatives 2 and order pieces 3 may be stopped temporarily even while the drive motor 21b is in operation. An appropriate number of drive roller sets 23 and 26 may be provided according to a length of the transport line.

The negative transport mechanism 20 includes a lower guide 27 and an upper guide 28, with a negative film transport passage formed therebetween, to transport the piece negatives 2 and order pieces 3 under accurate positional control. A loop cap 28a is disposed on part of the upper guide 28 in a region of the second transport section 20b. By opening the loop cap 28a, a loop may be formed in that region for temporary storage.

Further, a bar-code reader 40 is disposed above the first transport section 20a for reading the bar code recorded on each order seal 3b. The loop section 50 between the first transport section 20a and second transport section 20b includes a loop guide 51, and a solenoid 52 for controlling the loop guide 51.

An operation of the piece negative feeding apparatus 100 will be described next.

When the piece negative storage 10 is attached to the piece negative feeding apparatus 100, the storage detecting sensor 32 notifies the controller 7 that the piece negative storage 10 has been attached. If the auto negative mask 86 is ready to accept negatives, the first drive motor 21a is operated for the first winding core 11 to start taking up the elongate tape 13. As the elongate tape 13 is unwound from the second winding core 12, an order piece 3 is first fed out through the feeding port 14. When the first negative detecting sensor 33 detects the order seal 3b, the order piece 3 is stopped in a position for the bar code to be read by the bar-code reader 40. The bar-code reader 40 transmits additional printing information on this order to the controller 7. Then, the solenoid 52 in the loop section 50 is operated to raise the loop guide 51 to allow passage of the order piece 3.

The order piece 3 advances straight through the second transport section 20b and auto negative mask 86 to be discharged. Subsequently, piece negatives 2 are fed out through the feeding port 14, and is transported to the auto negative mask 86 by the first transport section 20a and second transport section 20b. When the negative detecting sensor 31 detects the forward end of piece negatives 2 having reached the first drive roller 87 of the auto negative mask 86, the press release solenoid 29 is operated to raise the press roller 26b. As a result, the piece negatives 2 are transported only by the drive rollers 87 of the auto negative mask 86. This avoids any inconvenience due to a difference in transporting speed between the second transport section 20b and the auto negative mask 86. The piece negatives 2 fed into the auto negative mask 86 are positioned to adjust the frames to be exposed to the exposure point. After the exposing process described hereinbefore, the piece negatives 2 are discharged. The piece negatives 2 are successively exposed in this way. The state of transport of the piece negatives 2 and order pieces 3 is monitored through the negative transport check sensor 36 which detects the perforations 2a and dummy perforations 3a. In the event of a transport blocking in the auto negative mask 86, the loop cap 28a is opened to allow subsequent piece negatives 2 to form an upward loop.

If the negative detecting sensor 31 of the auto negative mask 86 detects the forward end of piece negatives 2 after the second negative detecting sensor 34 of the negative transport mechanism 20 detects the forward end, the solenoid 52 of the loop section 50 is released, whereby the solenoid guide 51 interferes with the negative transport line to allow the piece negatives 2 to form a loop. This loop is detected by the loop sensor 35. With the loop formed in the negative transport line, all the piece negatives 2 in one order may be drawn out of the piece negative storage 10 and placed on the negative transport line, to realize improved operating efficiency. Until all the piece negatives 2 in one order have been exposed, the order piece 3 in a next order stands by in the reading position of the bar-code reader 40.

In the foregoing embodiment, each order piece 3 has, applied thereto, an order seal 3b recording additional printing information in the form of a bar code. Instead, the bar code may be recorded directly on the order piece 3. It is also possible to modify the order piece 3 to be a mark sheet as replacement for the bar code mode. In this case, the bar-code reader 40 is replaced by a mark sheet reader. The recording method may be varied, e.g. magnetic, optical and so on. It is an important feature of this invention to introduce order identifiers (the order pieces 3 being one example) as order demarcations between piece negatives 2, which order identifiers may be stored and transported in the same way as the piece negatives 2.

What is claimed is:

1. A piece negative feeding apparatus comprising:

a piece negative storage for sequentially storing piece negatives each having a perforation in a predetermined position thereof;

an order identifier storable in said piece negative storage to be arranged between the last piece negative in a preceding order and a leading piece negative in the subsequent order such that said piece negatives are demarcated order by order, said order identifier having a dummy perforation corresponding to said perforation in each of said piece negatives;

a negative transport mechanism for taking up a plurality of orders of said piece negatives and said order identifier one by one from said piece negative storage, and successively and independently transporting said piece negatives and said order identifier to an exposing section;

a sensor provided in said negative transport mechanism and responsive to said order identifier for recognizing demarcations between said orders; and a perforation-detecting sensor provided in said negative transport mechanism and operable to detect said perforation in each of said piece negatives and said dummy perforation in said order identifier to evaluate a state of transport of said piece negatives and said order identifier.

2. A piece negative feeding apparatus as defined in claim 1, wherein each of said order identifiers has order information such as an acceptance number recorded directly thereon.

3. A piece negative feeding apparatus as defined in claim 1, wherein each of said order identifiers has applied thereto an order seal recording order information such as an acceptance number.

4. A piece negative feeding apparatus as defined in claim 1, wherein said order identifiers comprise order pieces corresponding in width and thickness to said negative pieces.

5. A piece negative feeding apparatus as defined in claim 1, wherein each said piece negatives is transported to said exposing section for reorder printing, and wherein said order identifier has reorder information recorded therein.

* * * * *

UNITED STATES PATENT AND TRADEMARK OFFICE
CERTIFICATE OF CORRECTION

PATENT NO. : 6,025,903
DATED : Feb. 15, 2000
INVENTOR(S) : Yoshikawa et al.

It is certified that error appears in the above-identified patent and that said Letters Patent is hereby corrected as shown below:

On the cover page, in the section entitled Foreign Patent Documents, change "35 27 548A1 of 1987 Germany" to
-- 35 27 584  1987  Honerkamp  Germany --.
On the cover page, in the section entitled U.S. Patent Documents, change "9/1981" to -- 12/1979 --.
In column 1, line 51, change "S5642227" to -- S56-42227 --.
In column 4, line 24, before the word "negative" insert the word -- auto --.

Signed and Sealed this

Eighth Day of May, 2001

Attest:

NICHOLAS P. GODICI

Attesting Officer

Acting Director of the United States Patent and Trademark Office